United States Patent
Rawdon et al.

(10) Patent No.: US 8,439,313 B2
(45) Date of Patent: May 14, 2013

(54) FORWARD SWEPT WINGLET

(75) Inventors: Blaine K. Rawdon, San Pedro, CA (US); John C. Vassberg, Long Beach, CA (US)

(73) Assignee: The Boeing Company, Chicago, IL (US)

(*) Notice: Subject to any disclaimer, the term of this patent is extended or adjusted under 35 U.S.C. 154(b) by 407 days.

(21) Appl. No.: 12/905,382

(22) Filed: Oct. 15, 2010

(65) Prior Publication Data

US 2012/0091262 A1    Apr. 19, 2012

(51) Int. Cl.
*B64C 23/06* (2006.01)
*B64C 5/06* (2006.01)
*B64C 3/58* (2006.01)

(52) U.S. Cl.
USPC ......................................... 244/199.4; 244/91

(58) Field of Classification Search .................. 244/198, 244/199.1, 199.2, 199.4, 200.1, 201, 204, 244/204.1, 45 R, 87, 91
See application file for complete search history.

(56) References Cited

U.S. PATENT DOCUMENTS

| | | | |
|---|---|---|---|
| 4,674,709 A | | 6/1987 | Welles |
| 4,722,499 A | * | 2/1988 | Klug .......................... 244/199.4 |
| 4,776,542 A | * | 10/1988 | Van Dam ...................... 244/198 |
| 6,547,181 B1 | | 4/2003 | Hoisington et al. |
| 6,578,798 B1 | | 6/2003 | Dizdarevic et al. |
| 6,722,610 B1 | | 4/2004 | Rawdon et al. |
| 6,848,650 B2 | | 2/2005 | Hoisignton et al. |
| 6,886,778 B2 | | 5/2005 | McLean |
| 7,467,783 B2 | | 12/2008 | Rawdon |
| 7,534,082 B2 | | 5/2009 | Rawdon et al. |
| 7,641,177 B2 | | 1/2010 | Rawdon |
| 7,900,876 B2 | * | 3/2011 | Eberhardt ................... 244/199.4 |
| 2004/0262451 A1 | * | 12/2004 | McLean ...................... 244/45 R |
| 2009/0039204 A1 | | 2/2009 | Eberhardt |
| 2011/0180660 A1 | * | 7/2011 | Llamas Sandin ............. 244/1 N |

* cited by examiner

*Primary Examiner* — Joseph W Sanderson
(74) *Attorney, Agent, or Firm* — Charles L. Moore; Moore & Van Allen PLLC

(57) ABSTRACT

An aircraft may include a pair of wings. A forward swept winglet may be attached proximate to a wing tip of each wing. The forward swept winglet may include a leading edge and a trailing edge. The leading edge of each winglet may extend from the wing at a predetermined forward sweep angle relative to a line perpendicular to a chord of the wing tip in a direction corresponding to a forward portion of the aircraft.

20 Claims, 12 Drawing Sheets

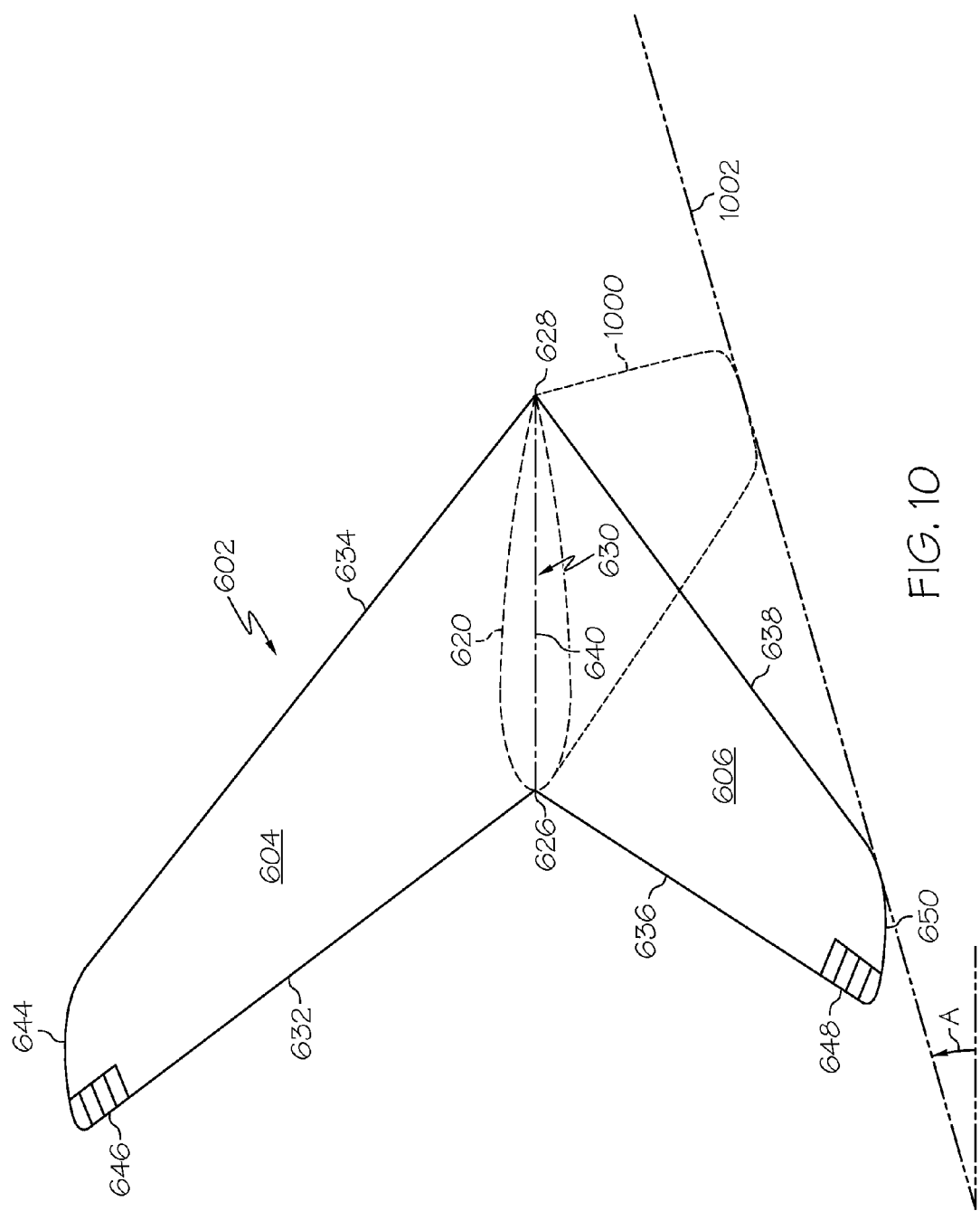

FORWARD SWEPT WINGLET

FIELD

The present disclosure relates to aircraft, and more particularly to a forward swept winglet for an aircraft wing.

BACKGROUND

The higher the lift-to-drag ratio (L/D ratio) of the wings of an aircraft, the more efficiently the aircraft may fly with less fuel consumption. One method to improve the L/D ratio of an airplane is to use a wing of greater span or length and shorter chord or distance from a leading edge of the wing to a trailing edge of the wing. In other words a wing with greater aspect ratio will have a higher L/D ratio and will be more efficient. Aspect ratio is defined as the wing span squared divided by the wing area. Several practical considerations may limit the degree to which aspect ratio may be increased. One limitation may be airport compatibility. Airports may be designed for airplanes with a certain maximum wing span. To operate at an airport, each airplane must have a wing span that is less than or equal to the maximum for the particular airport.

Another possible limitation may be wing weight. The use of a high aspect ratio wing can increase the airplane's L/D ratio but may not result in lower drag and may not result in less fuel consumption. Because the wing is a structural element, increasing its length increases the bending load the wing must resist. Accordingly the wing structure must be stronger or more robust to resist the bending load. The increased structure increases the wing's weight. Thus, a higher aspect ratio may result in a heavier airplane. Because drag is equal to airplane weight divided by the L/D ratio, a higher airplane weight may result in increased drag even if the L/D ratio is increased. In practice, wing aspect ratios are set to a value that results in minimum drag, or the aspect ratios are set to lower values that result in a significantly lighter airplane with drag that is slightly greater than minimum.

Another limitation to designing an aircraft wing with a higher L/D ratio or a higher aspect ratio may be wing flutter. Wing flutter is a dynamic phenomenon in which an approximately vertical (flapping) motion of the wing couples with a torsional mode (wing twist), resulting in unacceptable shaking in the wing that can cause structural damage. Wings can become more limber at higher aspect ratios which can lead to greater flutter susceptibility. This relationship sometimes limits the wing aspect ratio.

One existing method to alleviate the limitations discussed above is the use of a winglet at each wing tip. FIG. 1 illustrates an aircraft 100 including wings 102 and an aft-swept winglet 104 attached to a wing tip of each wing 102. The winglet 104 may provide the benefit of increased wing span without actually increasing the wing span. Winglets 104 may also reduce the bending load on the wing 102 compared to a conventional wing having an equivalent L/D ratio, thereby reducing the weight penalty of a wing with a larger span. However, especially for higher aspect ratio wings, aft-swept winglets 104 may result in increased flutter susceptibility. The aerodynamic benefit of winglets 104 is increased with increased winglet span, "S," or distance from a root 106 of the winglet 104 to a tip 108 of the winglet 104, but the structural and especially flutter susceptibility increases rapidly with winglet span. Thus flutter concerns tend to limit winglet span.

One factor affecting wing flutter susceptibility is reduction of the natural twisting frequency of the wing. The wing may be considered to be a torsional pendulum. Resistance to torsion is typically provided by the box or tube-like structure of the wing. Given the torsional rigidity provided by this structure, the frequency is primarily determined by the polar distribution of mass about a torsional axis 110 of the wing structure as well as a spanwise distribution of this mass. As an analogous example, consider a special clock that uses a torsional pendulum consisting of a thin vertical rod fixed to the clock at the top and free at the bottom. At the bottom of this rod a small dumbbell is attached. When this dumbbell is rotated about the axis of the rod, the rod provides torsional resistance. When the dumbbell is released, the dumbbell oscillates at a certain frequency according to its polar moment of inertia about the rod's axis and the rigidity of the rod. An increase in inertia reduces the frequency. Moving the dumbbell to a point midway on the rod will result in an increased frequency because of the higher effective rigidity of the rod. Longer winglets tend to have greater polar moment of inertia by virtue of their greater weight and greater length.

Another factor affecting wing flutter susceptibility is the rearward offset of the wing's mass with respect to the torsional axis 110 of the wing's structure. As the wing flies through the air, it makes lift that is proportional to its angle of attack. Increased lift tends to drive the wing upward, especially the outer portion of the wing. For instance, flying into an upward gust of air directly increases the wing's angle of attack which increases its lift which results in an upward acceleration, resulting in an upward deflection. If the center of mass of the wing is behind the torsional axis of the wing, then this upward gust will result in the wing twisting to a higher angle of incidence. This increases the angle of attack beyond the additional increment from the gust, resulting in an increased deflection. As the wing approaches the top of the stroke, it begins to decelerate. This tends to twist the wing to a reduced angle of attack, driving it downwards with increased force. If the torsional frequency of the wing coincides (or nearly coincides) with the wing bending (flapping) frequency, this oscillation can grow to a proportion that may result in damage to the wing. In general, as airspeeds increase, wing bending frequencies may tend to increase and torsional frequencies may decrease. At some speed these frequencies may coincide, leading to flutter. Wing flutter may also be influenced by fore and aft motions of the wing that are tied to the vertical motions. This type of motion is more likely in slender, high aspect ratio wings.

Aft-swept winglets, such as winglets 104, may increase flutter susceptibility because they may increase the polar moment of inertia of the wing 102 about the wing's torsional axis 110 and the winglets 104 do this at the wing tip, which may be the most undesirable location for such forces. Additionally, aft-swept winglets 104 add weight behind the wing's torsional axis 110 and this weight is also added at the wing tip. Increasing the span of aft-swept winglets 104 may also increase the polar moment of inertia and moves the wing's center of mass aft. Thus, longer winglets may further increase flutter by the two mechanisms described above.

An additional factor that constrains the span of the winglet pertains to ground clearance. Winglets may sweep up from the wing tip or may sweep down, or both. The aerodynamic benefit is approximately driven by the distance from the top of the upper winglet to the bottom of the lower winglet. From a flutter standpoint, the increase in polar moment of inertia would benefit from the upper and lower winglets having the same span. This puts the center of mass of the upper and lower winglets closer to the wing's torsional axis 110. Also, the center of mass of the winglets as a system is farther forward than if only a single winglet of the same span is used. Both the reduction in polar moment of inertia and forward offset of the center of mass reduces flutter susceptibility. However, the length of a lower winglet is limited by ground clearance. It is important that the winglet not contact the ground in any ordinary operation including landing and takeoff. Roll clearance is usually most critical when the airplane is pitched up for takeoff or landing. In this nose-up position, a lower aft swept winglet, especially when mounted on an aft swept wing, is closer to the ground by virtue of its more aft location. This means that a lower aft-swept winglet is relatively more constrained in span than an unswept winglet.

Accordingly, there is a need to improve the L/D ratio and performance of the wings of aircraft to improve efficiency and reduce fuel consumption. As described above, one technique to alleviate the limitations associated with a higher L/D ratio or a higher wing aspect ratio is the use of winglets. However, any winglet configurations need to avoid flutter susceptibility and other issues similar to those described above.

SUMMARY

In accordance with an embodiment, an aircraft may include a pair of wings. A forward swept winglet may be attached proximate to a wing tip of each wing. The forward swept winglet may include a leading edge and a trailing edge. The leading edge of each winglet may extend from the wing at a predetermined forward sweep angle relative to a line perpendicular to a chord of the wing tip in a direction corresponding to a forward portion of the aircraft.

In accordance with another embodiment, an aircraft may include a wing and a forward swept winglet attached proximate to a wing tip of the wing. The forward swept winglet may include an upper winglet portion extending above the wing and a lower winglet portion extending below the wing. A leading edge of at least the upper winglet portion may extend from the wing at a predetermined forward sweep angle relative to a line perpendicular to a chord of the wing tip in a direction corresponding to a forward portion of the aircraft.

In accordance with another embodiment, a method to reduce wing flutter in an aircraft wing designed to provide a substantially increased lift-to-drag ratio may include attaching a forward swept winglet proximate to a wing tip of each wing of the aircraft. The forward swept winglet may include a leading edge and a trailing edge. The leading edge of each winglet may extend at a predetermined forward sweep angle relative to a line perpendicular to a chord of the wing tip in a direction corresponding to a forward portion of the aircraft.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

FIG. 10 is a detailed side elevation view of a forward swept winglet including upper and lower winglet portions illustrating a comparison of ground clearance for forward and aft swept lower winglet portions in accordance with an exemplary embodiment of the present disclosure.

DESCRIPTION

The following detailed description of embodiments refers to the accompanying drawings, which illustrate specific embodiments of the disclosure. Other embodiments having different structures and operations do not depart from the scope of the present disclosure.

Figure 2:
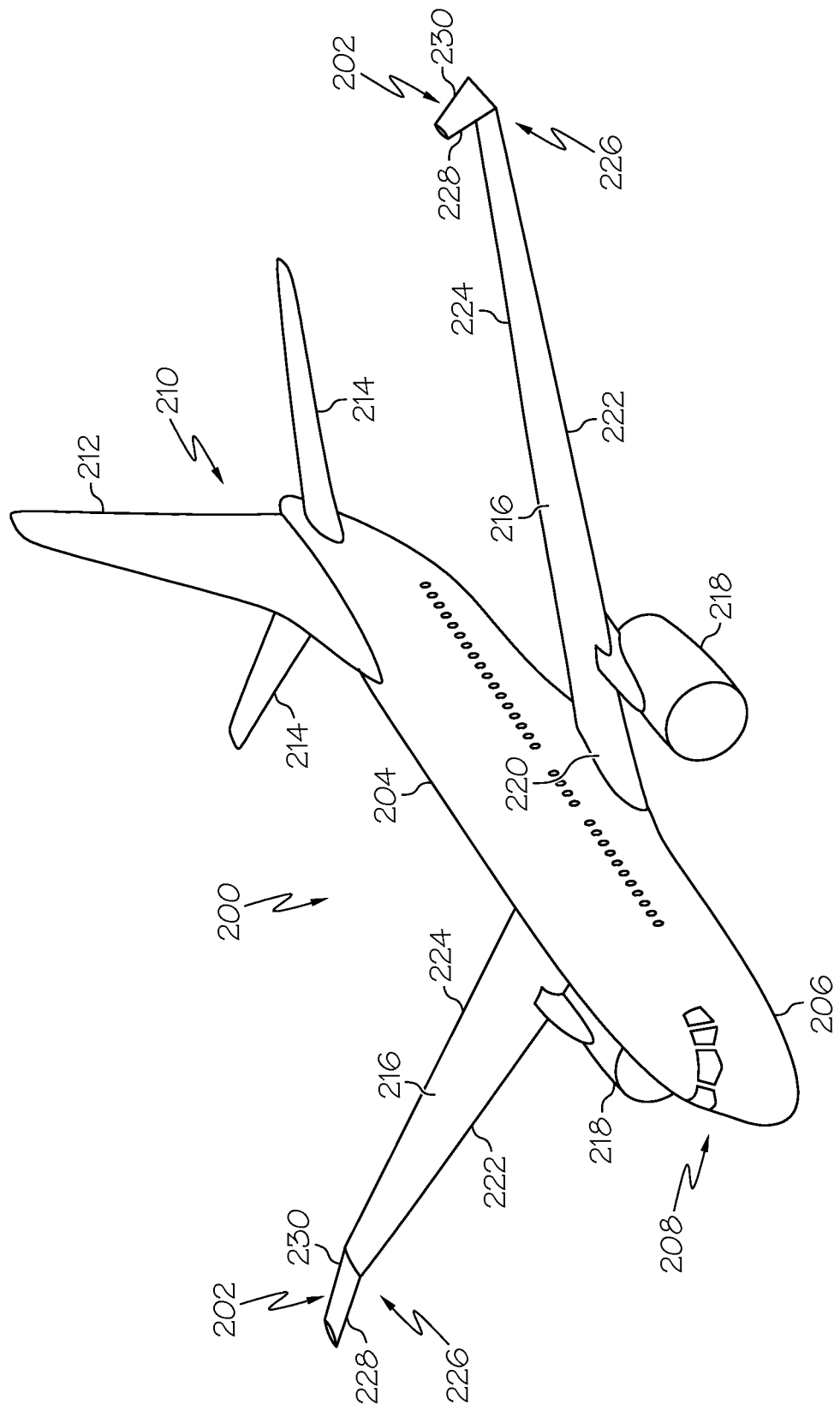
FIG. 2 is an illustration of an aircraft including upper forward swept winglets in accordance with an exemplary embodiment of the present disclosure.

FIG. 2 is an illustration of an aircraft 200 including upper forward swept winglets 202 in accordance with an exemplary embodiment of the present disclosure. In another embodiment, the aircraft 200 may also include only lower forward swept winglets which may have similar characteristics to those described herein. In a further embodiment, the aircraft 200 may include a forward swept winglet including both an upper winglet portion and a lower winglet portion. An exemplary embodiment of an aircraft including a forward swept winglet including both upper and lower winglet portions will be described in more detail with reference to FIGS. 6, 7A-7C and 10.

The aircraft 200 includes an elongate fuselage 204. The elongate fuselage 204 includes a nose or forward portion 206 of the fuselage 204 or aircraft 200, where a cockpit 208 is located, and an aft or tail portion 210 of the aircraft 200 where a vertical stabilizer and rudder flight control surface 212 are mounted and a horizontal stabilizer and elevator flight control surface 214 are mounted. The rudder 212 controls right and left motion of the aircraft 200 and the elevator 214 controls up and down or altitude of the aircraft 200.

A wing 216 is attached to each side of the fuselage 204 and extends from the fuselage 204. The exemplary aircraft 200 illustrated in FIG. 2 has engines 218 mounted under each wing 216; although as known in the art, the engines 218 may be mounted at other locations on the aircraft 200, such as proximate to the tail section 210 above the wing 216 or other locations depending upon the aircraft design. Each wing 216 may be attached to the fuselage 204 at a wing root 220. Each wing 216 includes a leading edge 222 and trailing edge 224 extending from the wing root 220 to a wing tip 226 opposite to the wing root 220.

A forward swept winglet 202 is attached proximate to the wing tip 226 of each wing 216. The forward swept winglet 202 may be attached at the wing tip 226 as illustrated in the exemplary embodiment in FIG. 2 or, in another embodiment, the winglet 202 may be attached at a predetermined distance from the wing tip 226 toward the wing root 220.

Figure 3A:
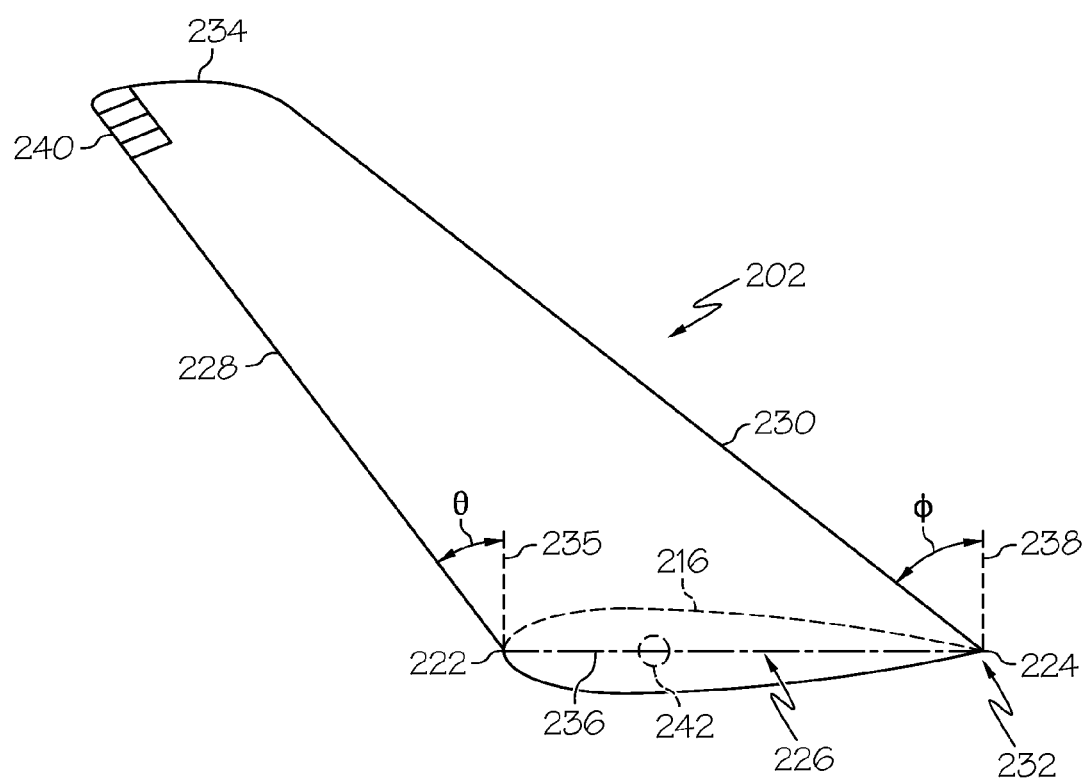
FIG. 3A is a detailed side elevation view of the upper forward swept winglet of FIG. 2 in accordance with an exemplary embodiment of the present disclosure.

Referring also to FIG. 3A, FIG. 3A is a detailed side elevation view of the upper forward swept winglet 202 of FIG. 2 in accordance with an exemplary embodiment of the present disclosure. The forward swept winglet 202 includes a leading edge 228 and a trailing edge 230. The leading edge 228 and trailing edge 230 may extend from a root 232 of the winglet 202 to a tip 234 of the winglet 202. The leading edge 228 and the trailing edge 230 may have a selected taper from the winglet root 232 to the winglet tip 234. The leading edge 228 of each winglet 202 may extend from the wing 216 or wing tip 226 at a predetermined forward sweep angle θ relative to a line 235 perpendicular or normal to a chord 236 of the wing tip 226 or wing 216 in a direction corresponding to the forward portion 206 of the aircraft 200. The chord 236 may be defined as the distance between the leading edge 222 and the trailing edge 224 of the wing 216 or wing tip 226. The chord 236 is illustrated by a broken or chain line in FIG. 3A.

The trailing edge 230 of the winglet 202 may also extend from the wing 216 or wing tip 226 at a selected forward sweep angle ϕ relative to another line 238 perpendicular to the chord 236 of the wing 216 or wing tip 226. The selected forward sweep angle ϕ of the trailing edge 230 of the winglet 202 may be greater than the predetermined forward sweep angle θ of the leading edge 228 of the winglet 202 to provide the selected taper of the winglet 202. In another embodiment, the selected forward sweep angle ϕ of the trailing edge 230 may be less than the predetermined forward sweep angle θ of the leading edge 228. The selected sweep angle ϕ may even sweep toward an aft or tail portion 210 of the aircraft 200 (FIG. 2).

The predetermined forward sweep angle θ of the leading edge 228 and selected forward sweep angle ϕ may vary. Considerations or parameters in determining the forward sweep angles may include but is not necessarily limited to a weight of the winglet; a wing span and area of each wing and winglet; a cruise Mach number at which the aircraft may be expected or designed to fly; any balancing mass or balancing mass weight in the winglet 202; and reducing induced drag of the winglet 202 or wing system including the wing 216 and winglet 202. In at least one embodiment, the predetermined forward sweep angle θ of the leading edge 228 of the winglet 202 may be greater than about 15 degrees and less than about 50 degrees.

The forward swept winglet 202 may be built using conventional methods to be of typically light weight. The winglet 202 may also include discrete a weight 240 for mass balance. The mass balance weight 240 or weights may be located at favorable locations in the winglet 202 for optimum distribution of mass balance. One potentially favorable location may be proximate the leading edge 228 and proximate the tip 234 of the forward swept winglet 202 similar to that illustrated in FIG. 3A.

Figure 1:
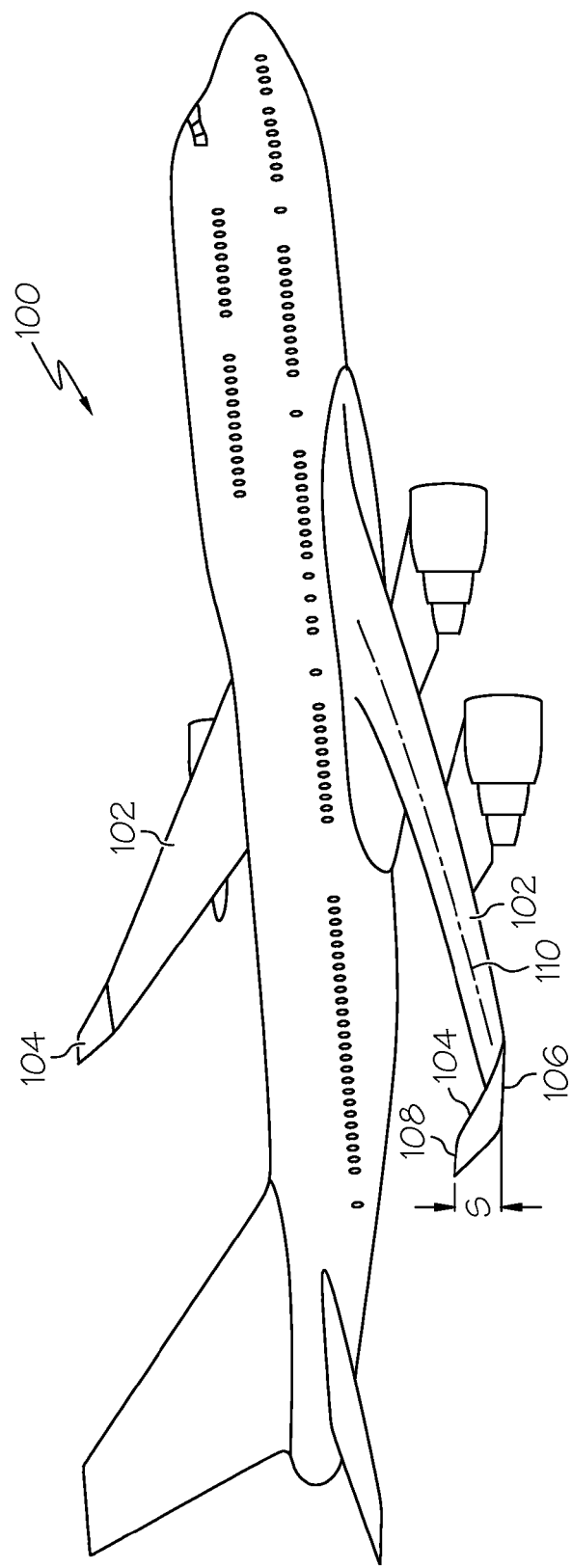
FIG. 1 is an illustration of an example of an aircraft including prior art aft swept winglets.

The weight of the forward swept winglet 202 is located ahead or forward of the weight of a similar aft-swept winglet, such as winglet 104 in FIG. 1. This more forward weight may reduce susceptibility to wing flutter when compared to a wing with an equivalent aft-swept winglet or a wing without a winglet. As discussed above, the forward swept winglet 202 may be used to mount a mass balance weight 240 at a favorable location such as near the leading edge 228 and near the tip 234. This mass balance 240 is well ahead or forward of the wing's torsional axis 242. This mass balance 240 further tends to suppress susceptibility to wing flutter. A chord of the forward swept winglet 202 may be substantially equal in length and correspond or align with the chord 236 of the wing 216 or wing tip 226.

Figure 3B:
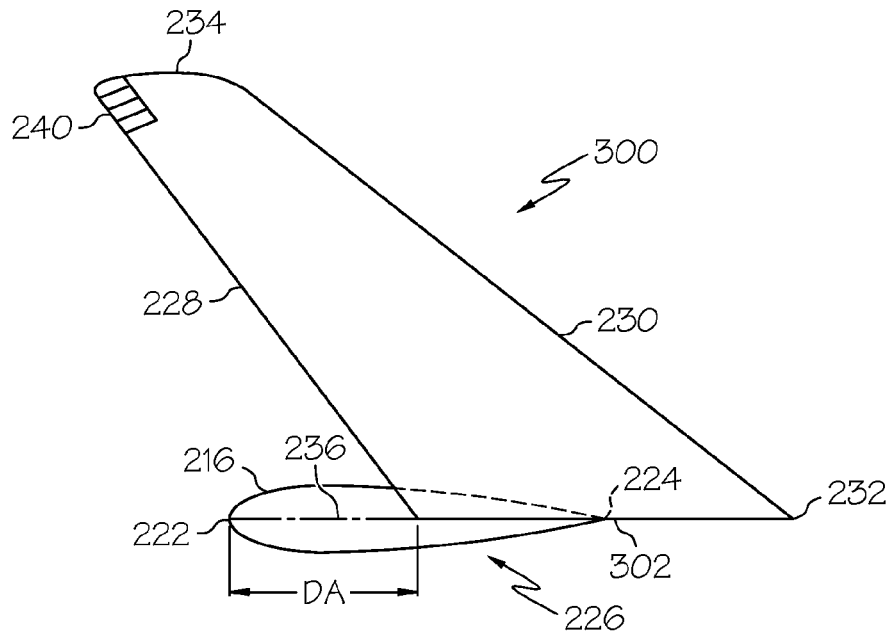
FIG. 3B is a detailed side elevation view of an upper forward swept winglet in accordance with another exemplary embodiment of the present disclosure.

Referring also to FIG. 3B, FIG. 3B is a detailed side elevation view of an upper forward swept winglet 300 in accordance with another exemplary embodiment of the present disclosure. The upper forward winglet 300 may be substantially the same as the upper forward winglet 202 in FIG. 3A except that a leading edge 228 of the winglet 300 is offset a selected distance "DA" from the leading edge 222 of the wing 216 or wing tip 226 in an aft direction. Described another way, a root or root chord 302 of the winglet 300 is attached to the wing tip 226 or wing 216 offset the selected distance "DA" relative to the chord 236 of the wing tip 226 or wing 216 in the aft direction. The remaining chord distribution of the winglet 300 may be determined by conventional aerodynamic considerations.

Figure 3C:
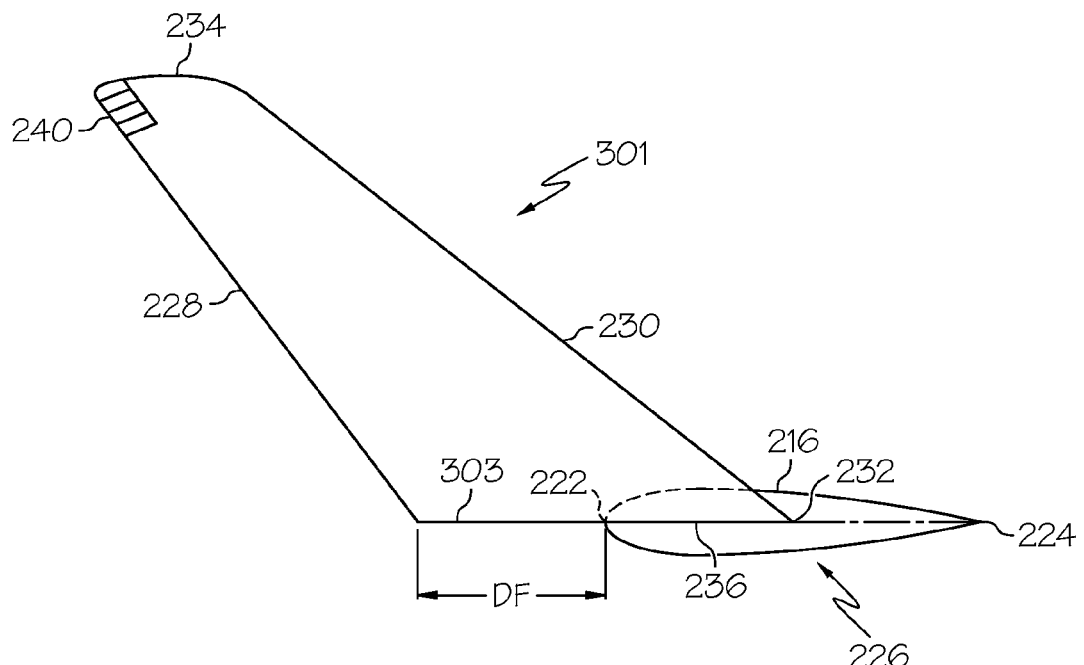
FIG. 3C is a detailed side elevation view of an upper forward swept winglet in accordance with a further exemplary embodiment of the present disclosure.

FIG. 3C is a detailed side elevation view of an upper forward swept winglet 301 in accordance with a further exemplary embodiment of the present disclosure. The upper forward winglet 301 may also be substantially the same as the upper forward winglet 202 in FIG. 3A except that a leading edge 228 of the winglet 301 is offset a selected distance "DF" from the leading edge 222 of the wing 216 or wing tip 226 in an forward direction. Described another way, a root or root chord 303 of the winglet 301 is attached to the wing tip 226 or wing 216 offset the selected distance "DF" relative to the chord 236 of the wing tip 226 or wing 216 in the forward direction. The remaining chord distribution of the winglet 301 may be determined by conventional aerodynamic considerations.

Figure 4:
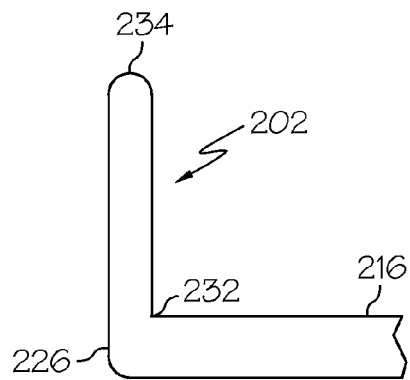
FIG. 4 is a detailed front elevation view of the upper forward swept winglet extending substantially perpendicular to the wing of the aircraft in accordance with an exemplary embodiment of the present disclosure.

FIG. 4 is a detailed front elevation view of the upper forward swept winglet 202 illustrating the winglet extending from the wing tip 226 substantially perpendicular to the wing 216 of the aircraft 200 in accordance with an exemplary embodiment of the present disclosure.

Figure 5:
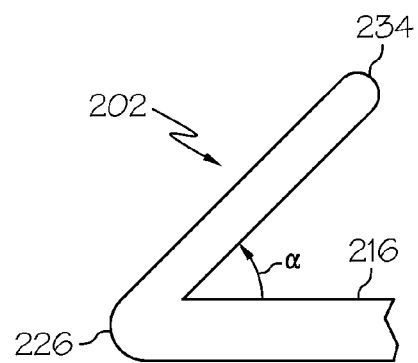
FIG. 5 is a detailed front elevation view of the upper forward swept winglet extending at a predetermined angle relative to the wing of the aircraft in accordance with another exemplary embodiment of the present disclosure.

FIG. 5 is a detailed front elevation view of the upper forward swept winglet 202 extending from the wing tip 226 at a chosen angle α relative to the wing 216 of the aircraft in accordance with another exemplary embodiment of the present disclosure. FIGS. 4 and 5 illustrate that the forward swept winglet 202 may extend from wing 216 at a chosen angle α in a direction inboard toward the fuselage 204 (FIG. 1) or outboard away from the fuselage. The chosen angle α may be between about 45 degrees and about 135 degrees.

Figure 6:
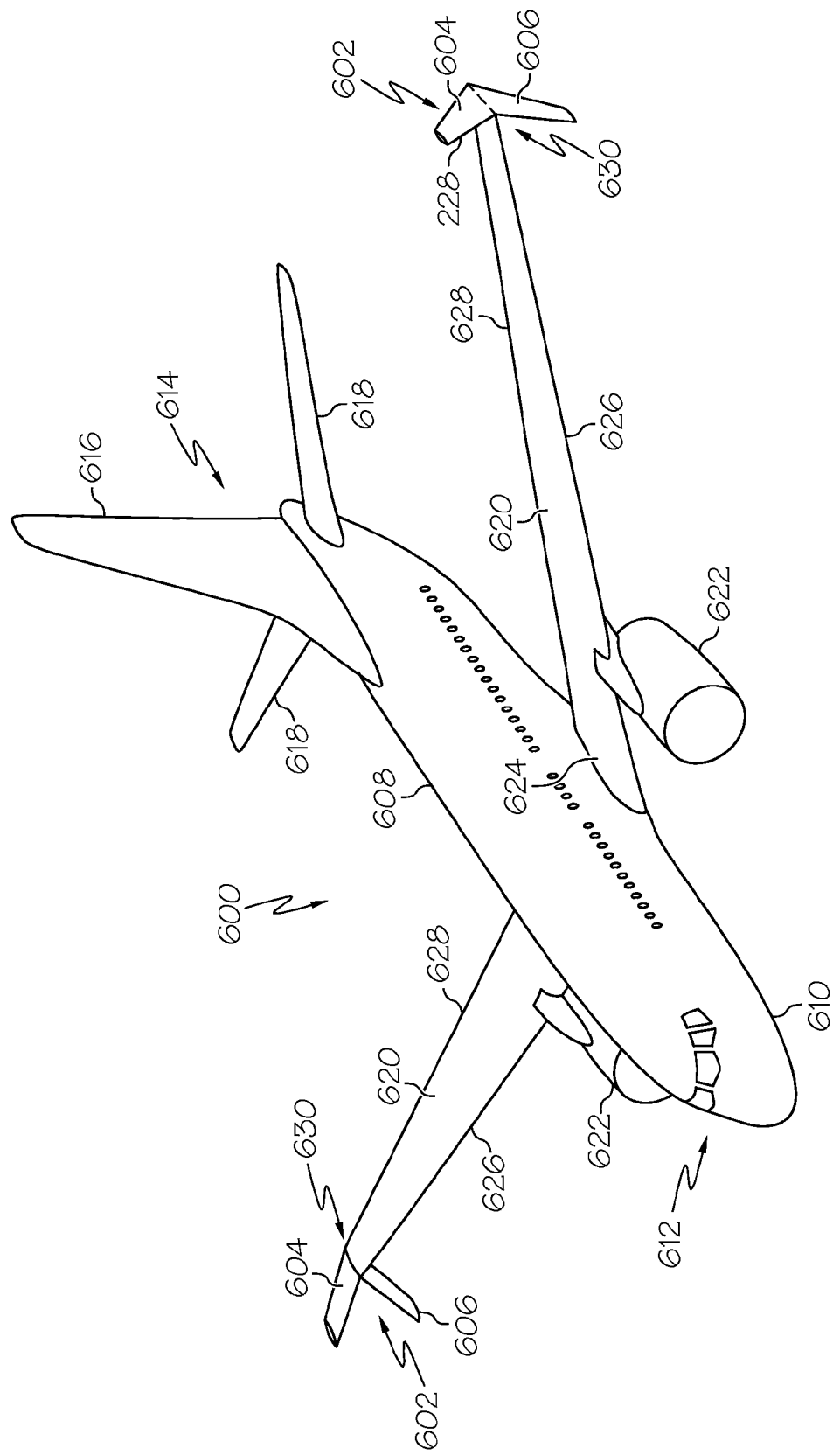
FIG. 6 is an illustration of an aircraft including forward swept winglets including an upper forward swept winglet portion and a lower forward swept winglet portion in accordance with another exemplary embodiment of the present disclosure.

FIG. 6 is an illustration of an aircraft 600 including a forward swept winglet 602 including an upper forward swept winglet portion 604 and a lower forward swept winglet portion 606 in accordance with another exemplary embodiment of the present disclosure. The aircraft 600 may be similar to the aircraft 200 in FIG. 2. The aircraft 600 includes an elongate fuselage 608. The elongate fuselage 608 includes a nose or forward portion 610, where a cockpit 612 is located, and an aft or tail portion 614 of the aircraft 600. A vertical stabilizer and rudder flight control surface 616 and a horizontal stabilizers and elevator flight control surface 618 are mounted to the aft or tail portion 614 of the aircraft 600.

A wing 620 is attached to each side of the fuselage 608 and extends from the fuselage 608. The exemplary aircraft 600 illustrated in FIG. 6 has engines 622 mounted under each wing 220; although as known in the art and as previously described, the engines 622 may be mounted at other locations on the aircraft 600. Each wing 620 may be attached to the fuselage 608 at a wing root 624. Each wing 620 includes a leading edge 626 and trailing edge 628 extending from the wing root 624 to a wing tip 630 opposite to the wing root 624. The forward swept winglet 602 may be attached to the wing tip 630 or to the wing 620 proximate to the wing tip 630.

Figure 7A:
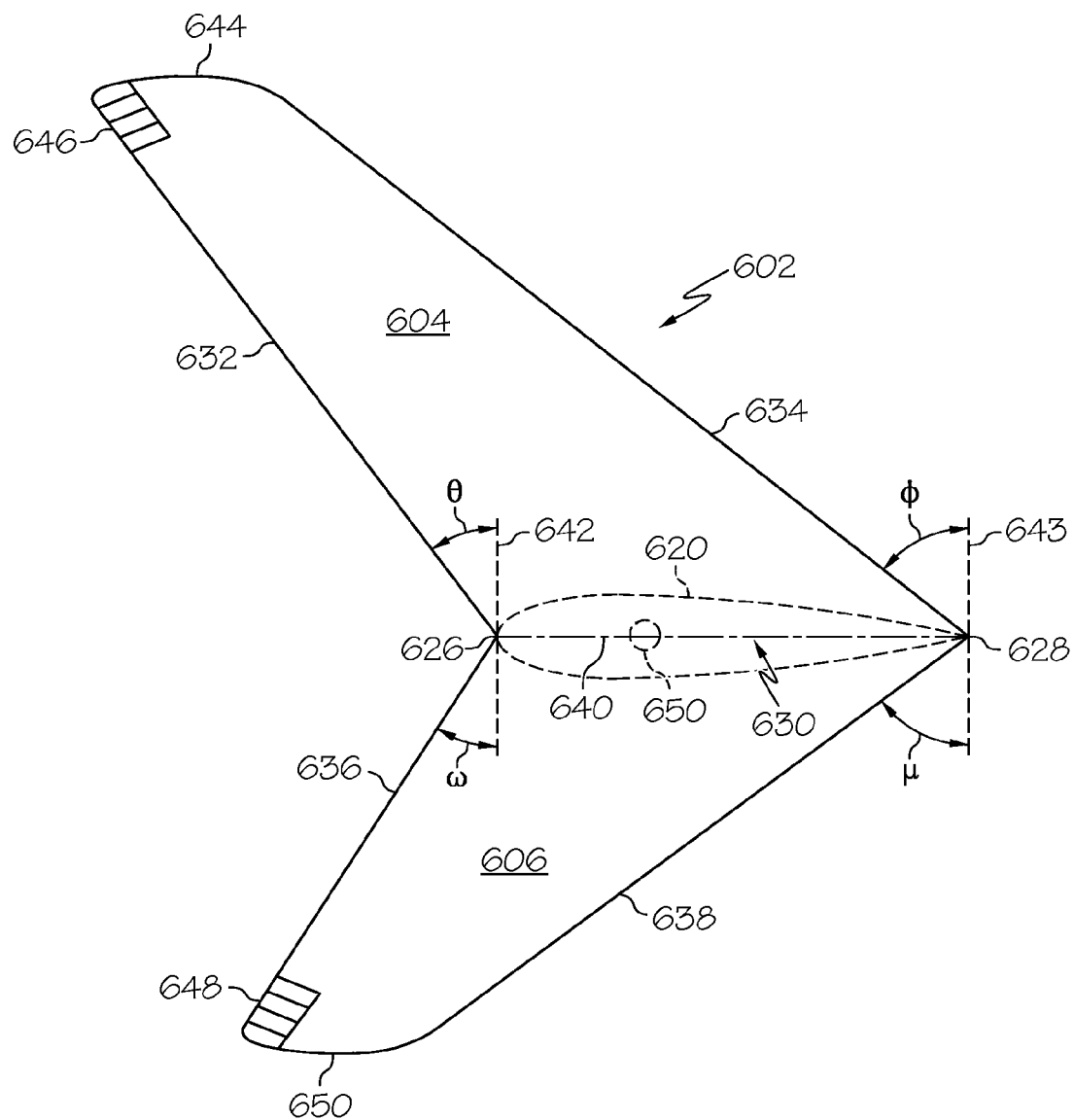
FIG. 7A is a detailed side elevation view of the forward swept winglet of FIG. 6 including the upper and lower winglet portions in accordance with an exemplary embodiment of the present disclosure.

Referring also to FIG. 7A, FIG. 7A is a detailed side elevation view of the forward swept winglet 602 of FIG. 6 including the upper and lower winglet portions 604 and 606 in accordance with an exemplary embodiment of the present disclosure. The upper winglet portion 604 extends above the wing 620 or wing tip 630 and the lower winglet portion 606 extends below the wing 620 or wing tip 630. The upper winglet portion 604 includes a leading edge 632 and a trailing edge 634. The lower winglet portion 606 includes a leading edge 636 and a trailing edge 638. The leading edge 632 of at least the upper winglet portion 604 may extend from the wing 620 or wing tip 630 at a predetermined forward sweep angle θ relative to a line 642 perpendicular to the chord 640 of the wing tip 630 in a direction corresponding to the forward portion 610 of the aircraft 600.

The leading edge 636 of the lower winglet portion 606 may also extend from the wing 620 or wing tip 630 at a selected forward angle ω relative to the perpendicular line 642 to the chord 640 of the wing 620 in a direction toward the forward portion 610 of the aircraft 600. The selected forward sweep angle ω of the leading edge 636 of the lower winglet portion 606 may be different than the predetermined forward sweep angle θ of the upper winglet portion 604. While the lower winglet portion 606 is illustrated in the exemplary embodiment in FIG. 7A as sweeping forward, in another embodiment, the lower winglet portion 606 may sweep aft or may not sweep in either direction.

The trailing edge 634 of the upper winglet portion 604 may sweep forward at a chosen sweep angle φ relative to another line 643 perpendicular to the chord 630 of the wing 620 or wing tip 630. The chosen sweep angle φ may be different from the predetermined sweep angle θ of the leading edge 632 of the upper winglet portion 604 and the selected sweep angle ω of the leading edge 636 of the lower winglet portion. The chosen sweep angle φ of the trailing edge 634 may be greater than the predetermined sweep angle θ of the leading edge 632 of the upper winglet portion 604 so that the upper winglet portion tapers toward a tip 644 of the upper winglet portion 604.

In another embodiment, the chosen sweep angle φ of the trailing edge 634 may be less than the predetermined sweep angle θ of the leading edge 632 of the upper winglet portion 604 so that the upper winglet portion widens toward a tip 644 of the upper winglet portion 604.

Similarly, the trailing edge 638 of the lower winglet portion 606 may extend from the wing 620 or wing tip 630 at a predetermined angle μ which may be less than, equal to or greater than the chosen angle ω of the leading edge 636.

The upper winglet portion 604 and the lower winglet portion 606 may each include a mass balance weight 646 and 648 respectively or only one of the winglet portions may include a mass balance weight. The mass balance weight 646 and 648 may be located at predetermined favorable locations in each of the upper and lower winglet portions 604 and 606. One potential favorable location in each winglet portion 604 and 606 may be proximate to the leading edge 632 and 636 and proximate to the tip 644 and 650. Thus, a mass balance of a chosen weight may be positioned at a farthest forward position of each of the upper and lower winglet portions 604 and 606. The optimum amount of mass balance 646 and 648 in each winglet portion 604 and 606 may be different.

Figure 7B:
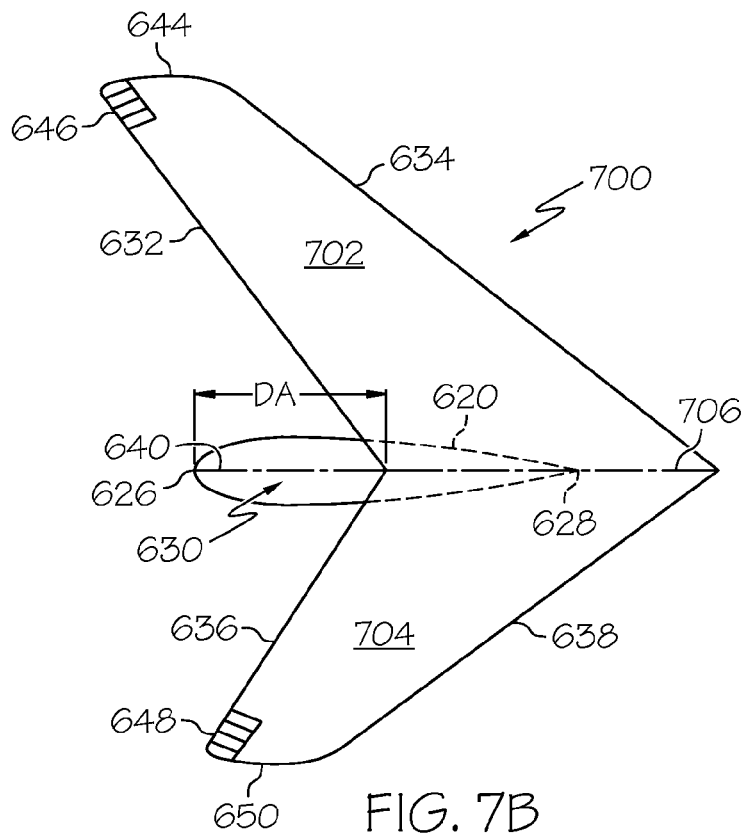
FIG. 7B is a detailed side elevation view of a forward swept winglet including upper and lower winglet portions in accordance with another exemplary embodiment of the present disclosure.

FIG. 7B is a detailed side elevation view of a forward swept winglet 700 including upper and lower winglet portions 702 and 704 in accordance with another exemplary embodiment of the present disclosure. The forward winglet 700 may be substantially the same as the forward winglet 702 in FIG. 7A except that a leading edge 632 of the upper winglet portion 702 and the leading edge 636 of the lower winglet portion 704 are offset a selected distance "DA" from the leading edge 626 of the wing 620 or wing tip 630 in an aft direction. Described another way, a root or root chord 706 of the winglet 700 is attached to the wing tip 630 or wing 620 offset the selected distance "DA" relative to the chord 640 of the wing tip 630 or wing 620 in the aft direction. The remaining chord distribution of the winglet 700 may be determined by conventional aerodynamic considerations. While the leading edges 632 and 634 are illustrated in FIG. 7B as being offset by the same distance "DA" from the leading edge of the wing 620, the leading edges 632 and 634 may be offset by different distances. One or the other of the leading edges 632 and 636 may even be forward of the leading edge 626 of the wing 620 similar to that illustrated in FIG. 7C.

Figure 7C:
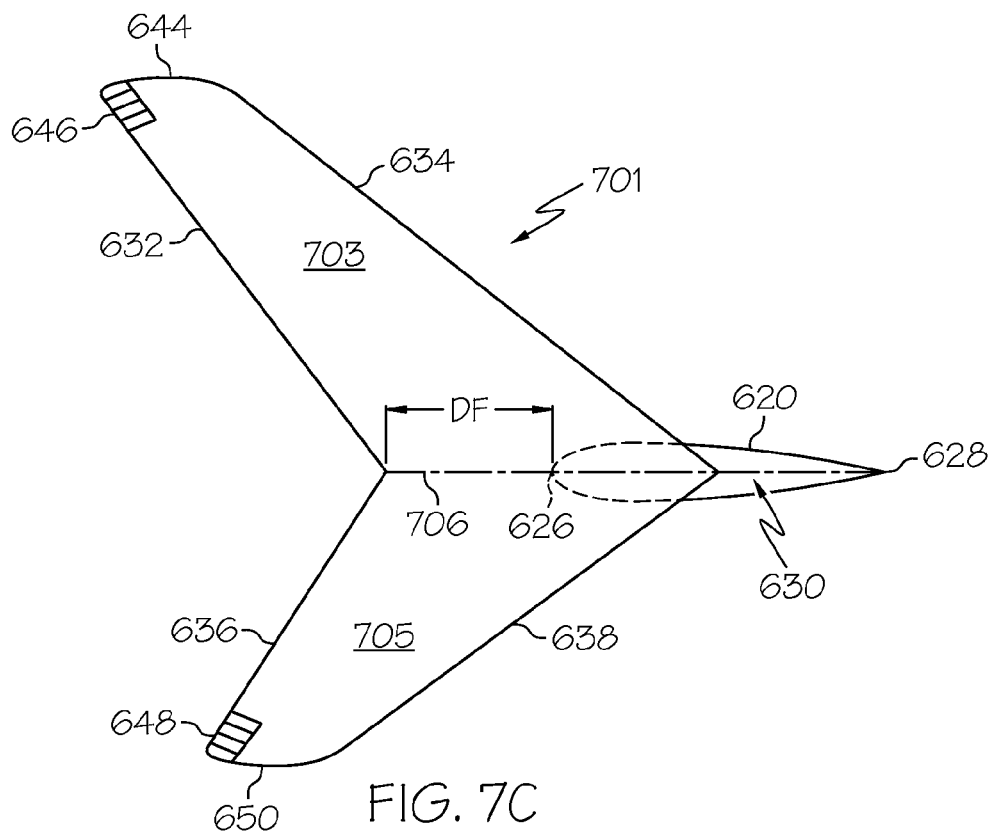
FIG. 7C is a detailed side elevation view of a forward swept winglet including upper and lower winglet portions in accordance with a further exemplary embodiment of the present disclosure.

FIG. 7C is a detailed side elevation view of a forward swept winglet 701 including upper and lower winglet portions 703 and 705 in accordance with a further exemplary embodiment of the present disclosure. The forward swept winglet 701 may also be substantially the same as the forward swept winglet 602 in FIG. 7A except that the leading edges 632 and 636 of the upper and lower winglet portions 703 and 705 are offset a selected distance "DF" from the leading edge 626 of the wing 620 or wing tip 630 in an forward direction. Described another way, a root or root chord 706 of the winglet 701 is attached to the wing tip 630 or wing 620 offset the selected distance "DF" relative to the chord 640 of the wing tip 630 or wing 620 in the forward direction. The remaining chord distribution of the winglet 701 may be determined by conventional aerodynamic considerations.

Figure 8:
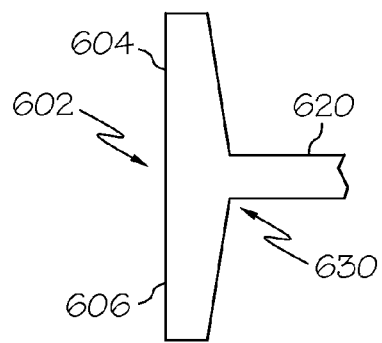
FIG. 8 is a detailed front elevation view of the forward swept winglet including upper and lower winglet portions extending substantially perpendicular to the wing of the aircraft in accordance with an exemplary embodiment of the present disclosure.

FIG. 8 is a detailed front elevation view of the forward swept winglet 602 including upper and lower winglet portions 604 and 606 extending substantially perpendicular to the wing 620 of the aircraft 600 in accordance with an exemplary embodiment of the present disclosure.

Figure 9:
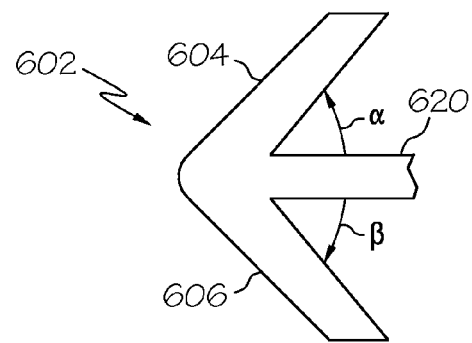
FIG. 9 is a detailed front elevation view of the forward swept winglet including upper and lower winglet portions extending at a predetermined angle relative to the wing of the aircraft in accordance with another embodiment of the present disclosure.

FIG. 9 is a detailed front elevation view of the forward swept winglet 602 including upper and lower winglet portions 604 and 606 extending at predetermined angles α and β relative to the wing 620 of the aircraft 620 in accordance with another embodiment of the present disclosure. FIGS. 8 and 9 illustrate that each of the winglet portions 604 and 606 of the winglet 602 may extend from wing 620 at the same or a different predetermined angles α and β in a direction inboard toward the fuselage 608 (FIG. 6) or outboard away from the fuselage 608. The predetermined angles α and β may be between about 45 degrees and about 135 degrees.

FIG. 10 is a detailed side elevation view of the forward swept winglet 602 including upper and lower winglet portions 604 and 606 illustrating a comparison of ground clearance for forward and aft swept lower winglet portions in accordance with an exemplary embodiment of the present disclosure. An aft-swept winglet 1000 is shown by a dotted line and ground clearance is represented in FIG. 10 by the chain line 1002. The ground clearance 1002 is illustrated at an angle A relative to horizontal to represent the orientation of the winglet 602 and the aft-swept winglet 1000 when the aircraft 600 rotates into a nose up position for take off or landing. As illustrated in FIG. 10, a forward swept lower winglet portion 606 may have a much longer span compared to the aft-swept winglet 1000.

The structure of the forward swept winglet 202 and 602 as illustrated in FIGS. 3A and 7A function to increase the aerodynamic efficiency of the wing 216 (FIG. 2) and 620 (FIG. 6). The winglet 202 and 602 influences a greater mass of air flowing over the wing 216 and 620. This reduces the downwash angle and induced drag of the wing. This benefit is sensitive primarily to the ratio of the height of the winglet (upper tip to lower tip) to the wing span.

The forward swept winglets 202 and 602 also serve to move the center of mass of the outer portion of the wing forward. Moving the center of mass of the wing forward is intended to reduce the wings susceptibility to flutter as previously described. The winglets 202 and 602 add mass to the wing tip that is forward of the torsional axis 242 (FIG. 3A) and 650 (FIG. 7A) of the wing 216 and 620. This may be accomplished by the weight of the winglet itself being forward of the torsional axis 242 and 650 and a mass balance may be located in the winglet 202 and 602 as described herein to add additional mass as far forward as possible from the wing torsional axis 242 and 650.

A center of gravity of the winglet 202 may be adjusted or a center of gravity of each of the upper winglet portion 604 and lower winglet portion 606 may be adjusted vertically. In this way, the response of the wing may be tuned to fore and aft motion of the wing and to reduce susceptibility to wing flutter. The tuning may involve varying the span of the upper and lower winglet portions. A longer upper winglet portion span with a shorter lower winglet span tends to move the entire winglet center of gravity upwards. Tuning may also involve adjusting the mass balance in the upper and lower winglet portions. For example increasing the mass balance in the upper winglet while reducing the mass balance in the lower winglet portion may move the entire winglet's center of mass upward.

In accordance with different embodiments, different combinations of forward swept and aft-swept upper and lower winglet portions similar to those described herein may achieve different results. For example, only a lower forward swept winglet may achieve the ground clearance illustrated in FIG. 10 along with the other features describe herein. A forward swept lower winglet could be used with an aft swept upper winglet to achieve a larger winglet span. A forward swept upper winglet could be combined with an aft swept lower winglet, especially when the upper winglet contains a mass balance weight to provide some benefits of a forward swept winglet with reduced yaw torque on the outer wing box or structure resulting from an airplane side slip in flight.

Figure 11:
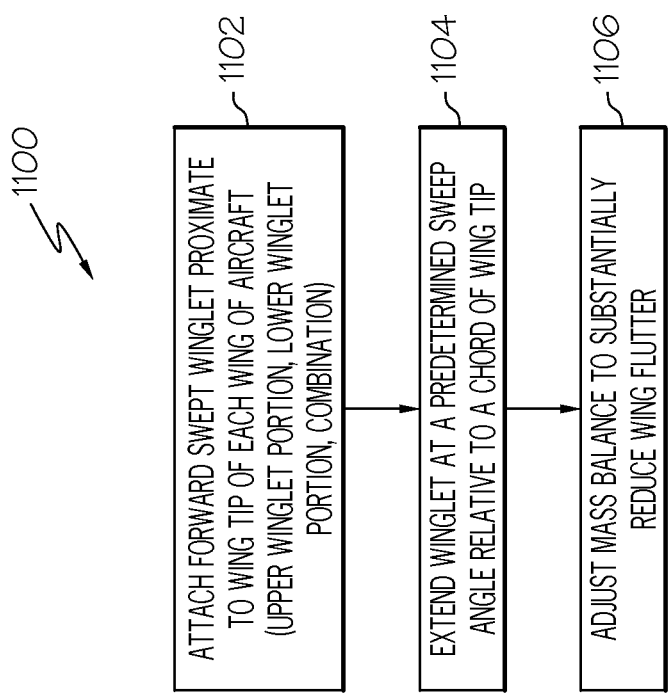
FIG. 11 is a flow chart of an example of a method to reduce wing flutter in an aircraft wing in accordance with an embodiment of the present disclosure.

FIG. 11 is a flow chart of an example of a method 1100 to reduce wing flutter in an aircraft wing in accordance with an embodiment of the present disclosure. In block 1102, a forward swept winglet may be attached to each wing of an aircraft proximate to a wing tip of each wing. The winglet may include a forward swept upper winglet portion only, a forward swept lower winglet portion only or a combination of a lower and upper winglet portion. The combination of upper and lower winglet portions may also include both portions being swept forward or any one of the upper and lower portions being swept forward and the other portion swept aft. Any of the winglet portions may be offset either forward or aft relative to a chord of the wing tip or wing similar to that previously described herein to provide desired operating characteristics, such as reduced wing flutter and increased ground clearance.

In block 1104, the winglet or each winglet portion may extend at a predetermined sweep angle relative to the chord of the wing tip or wing. The winglet portion may also extend at a selected angle in an inboard or outboard direction relative to a fuselage of the aircraft similar to that previously described herein.

In block 1106, a mass balance may be adjusted in the winglet to substantially reduce wing flutter. The mass balance may be adjusted in either an upper winglet portion, lower winglet portion or both. The sweep angle of the winglet or sweep angles of the winglet portions may be adjusted along with the mass balance to determine the optimum configuration for substantially reducing wing flutter and improving aerodynamic operation of the wing to reduce fuel consumption.

Figure 12:
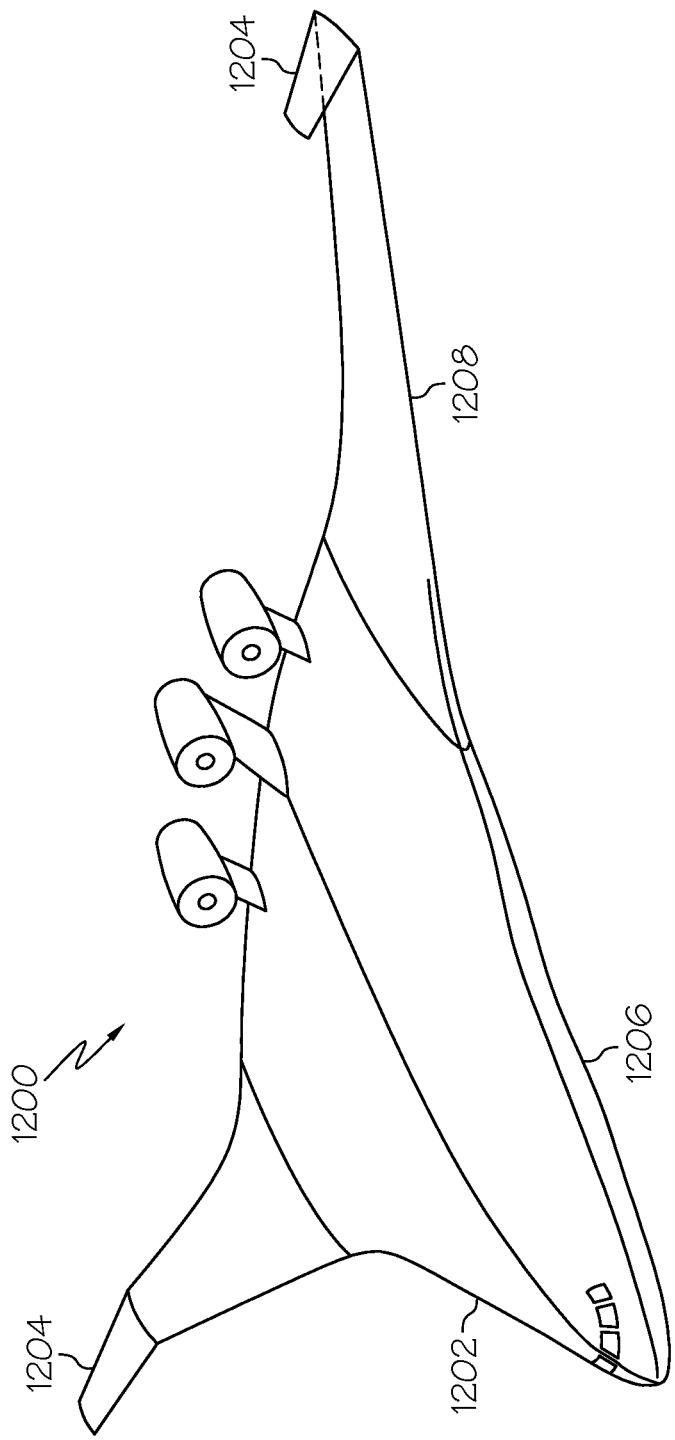
FIG. 12 is an example of an aircraft having a blended wing body configuration including forward swept winglets in accordance with an embodiment of the present disclosure.

While the present disclosure has described examples of forward swept winglets in association with an aircraft including an elongate fuselage configuration or tube and wing configuration, the forward swept winglets may also be applicable to other type aircraft configurations. For example, FIG. 12 is an example of an aircraft 1200 having a blended wing body configuration 1202 including forward swept winglets 1204 in accordance with an embodiment of the present disclosure. The blended wing body configuration 1202 may include a fuselage or body 1206 that basically forms an inner portion of the wing and gradually transitions to a wing portion 1208. The forward swept winglets 1204 may be similar to those previously disclosed. While the forward swept winglet 1204 is illustrated as extending upward from the wing 1208, in other embodiments, the winglet 1204 could extend downward or could include both upper winglet portions and lower winglet portions similar to that previously described.

Figure 13:
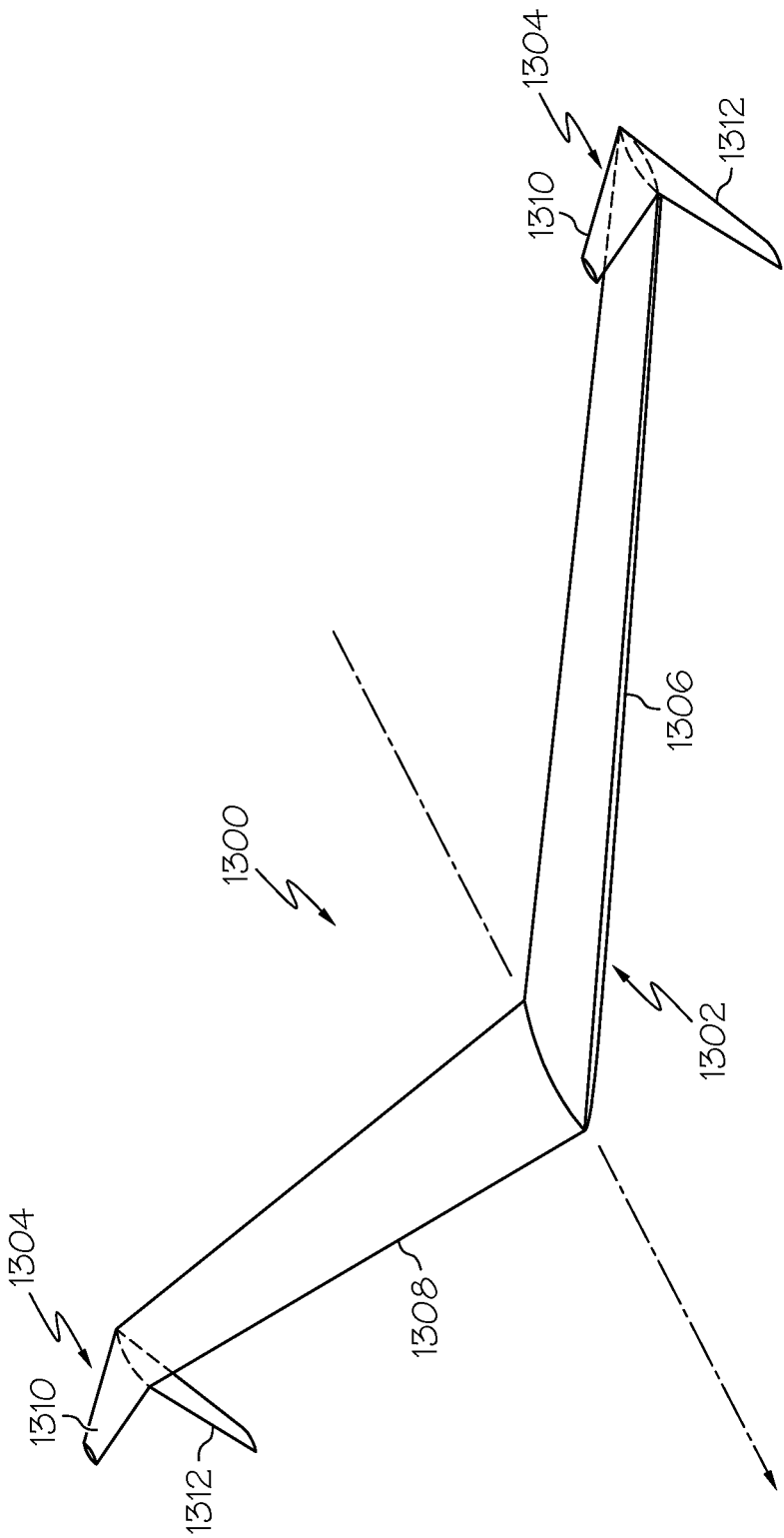
FIG. 13 is an example of an aircraft having a flying wing configuration including forward swept winglets in accordance with an embodiment of the present disclosure.

FIG. 13 is an example of another aircraft 1300 having a flying wing type configuration 1302 including forward swept winglets 1304 in accordance with an embodiment of the present disclosure. The flying wing type configuration may include a pair of wings 1306 and 1308 that may be joined to form a single wing structure similar to that illustrated in FIG. 13. The winglets 1304 are illustrated in FIG. 13 as including both an upper winglet portion 1310 and a lower winglet portion 1312. In other embodiments, the winglets 1304 may only have an upper winglet portion 1310 or only a lower winglet portion 1312.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. An aircraft, comprising:
   a pair of wings;
   a forward swept winglet attached proximate to a wing tip of each wing, the forward swept winglet including a leading edge and a trailing edge, the leading edge of each winglet extending from the wing at a predetermined forward sweep angle relative to a line perpendicular to a chord of the wing tip in a direction corresponding to a forward portion of the aircraft; and
   at least one mass balance in the winglet forward of the wing's torsional axis.

2. The aircraft of claim 1, wherein the predetermined forward sweep angle is determined by a group of parameters comprising a weight of the winglet, a wing span and area of each wing, a cruise Mach number of the aircraft, balancing mass in the winglet and reducing induced drag.

3. The aircraft of claim 1, wherein the forward swept winglet comprises a root chord that is substantially equal in length to the chord of the wing tip.

4. The aircraft of claim 1, wherein a root chord of the forward swept winglet is shorter than the chord of the wing tip.

5. The aircraft of claim 1, wherein a root chord of the forward swept winglet is longer than the chord of the wing tip.

6. The aircraft of claim 1, wherein the forward swept winglet comprises a root that is attached to the wing tip offset a selected distance in either a forward or aft direction relative to the chord of the wing tip.

7. The aircraft of claim 1, wherein the trailing edge of the forward swept winglet extends from the wing at a selected forward sweep angle relative to the line perpendicular to the chord of the wing tip.

8. The aircraft of claim 7, wherein the selected forward sweep angle of the trailing edge of the winglet is greater than the predetermined forward sweep angle of the leading edge of the winglet.

9. The aircraft of claim 1, wherein the forward swept winglet extends above the wing.

10. The aircraft of claim 1, wherein the forward swept winglet comprises a lower forward swept winglet portion extending below the wing.

11. The aircraft of claim 1, wherein the forward swept winglet comprises:
    an upper winglet portion extending above the wing at the predetermined forward sweep angle; and
    a lower portion extending below the wing.

12. The aircraft of claim 11, wherein the at least one mass balance comprises at least one mass balance of a chosen weight positioned at a selected location in at least one of the upper winglet portion and the lower winglet portion.

13. The aircraft of claim 11, wherein the at least one mass balance comprises a mass balance of a chosen weight positioned at a farthest forward position of each of the upper winglet portion and the lower winglet portion.

14. The aircraft of claim 1, wherein the forward swept winglet extends from the wing at a chosen angle in a direction inboard toward the fuselage or outboard away from the fuselage, the chosen angle being between substantially vertical to an extent of the wing and about 45 degrees from substantially vertical.

15. The aircraft of claim 1, wherein the aircraft comprises one of an elongated fuselage to which the wings are attached, a blended wing body configuration and a flying wing configuration wherein the pair of wings are joined to form a single wing structure.

16. An aircraft, comprising:
    a wing;
    a forward swept winglet attached proximate to a wing tip of the wing, the forward swept winglet comprising an upper winglet portion extending above the wing and a lower winglet portion extending below the wing, a leading edge of at least the upper winglet portion extending from the wing at a predetermined forward sweep angle relative to a line perpendicular to a chord of the wing tip in a direction corresponding to a forward portion of the aircraft; and
    at least one mass balance in the winglet forward of the wing's torsional axis.

17. The aircraft of claim 16, wherein the lower winglet portion includes a leading edge and a trailing edge, the leading edge of the lower winglet portion extending from the wing at a selected forward sweep angle relative to the line perpendicular to the chord of the wing tip in a direction toward the forward portion of the aircraft.

18. The aircraft of claim 16, wherein the at least one mass balance comprises a mass balance of a chosen weight positioned at a farthest forward position of each of the upper winglet portion and the lower winglet portion.

19. A method to reduce wing flutter in an aircraft wing designed to provide a substantially increased lift-to-drag ratio, the method comprising:
    attaching a forward swept winglet proximate to a wing tip of each wing of the aircraft, the forward swept winglet including a leading edge and a trailing edge, the leading edge of each winglet extending at a predetermined forward sweep angle relative to a line perpendicular to a chord of the wing tip in a direction corresponding to a forward portion of the aircraft; and
    providing at least one mass balance in the winglet forward of the wing's torsional axis.

20. The method of claim 19, wherein attaching the forward swept winglet comprises:
    attaching an upper winglet portion extending above the wing at the predetermined forward sweep angle; and
    attaching a lower winglet portion extending below the wing.

* * * * *